US012570840B2

(12) United States Patent
Hamaguchi et al.

(10) Patent No.: US 12,570,840 B2
(45) Date of Patent: Mar. 10, 2026

(54) FLAME-RETARDANT RESIN COMPOSITION, FLAME-RETARDANT RESIN HOUSING, AND ELECTRONIC DEVICE

(71) Applicant: Konica Minolta, Inc., Tokyo (JP)

(72) Inventors: Shinichi Hamaguchi, Hino (JP); Kosuke Nakamura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 879 days.

(21) Appl. No.: 17/807,977

(22) Filed: Jun. 21, 2022

(65) Prior Publication Data

US 2023/0042264 A1 Feb. 9, 2023

(30) Foreign Application Priority Data

Jul. 12, 2021 (JP) ............................ JP2021-114712

(51) Int. Cl.

*C08L 23/06* (2006.01)
*C08L 5/04* (2006.01)
*C08L 23/12* (2006.01)

(52) U.S. Cl.

CPC ................ *C08L 23/06* (2013.01); *C08L 5/04* (2013.01); *C08L 23/12* (2013.01); *C08L 2201/02* (2013.01); *C08L 2207/062* (2013.01)

(58) Field of Classification Search

CPC .. C08L 23/06; C08L 5/04; C08L 23/12; C08L 2201/02; C08L 2207/062; C08K 3/22; C08K 2003/2227; C08K 2201/011

See application file for complete search history.

(56) References Cited

U.S. PATENT DOCUMENTS 4,186,756 A * 2/1980 Takemoto .............. A24B 15/14
131/369

FOREIGN PATENT DOCUMENTS

| | | | | |
|---|---|---|---|---|
| CN | 111363245 | A | | 7/2020 |
| CN | 112375289 | A | | 2/2021 |
| JP | H05-043747 | A | | 2/1993 |
| JP | H0543747 | A | * | 2/1993 |
| JP | 2003-213149 | A | | 7/2003 |
| JP | 2004-263187 | A | | 9/2004 |
| JP | 2006-077215 | A | | 3/2006 |
| JP | 2007-262141 | A | | 10/2007 |

(Continued)

OTHER PUBLICATIONS

English Translation of JP 2013-231092 A (Year: 2013).*

(Continued)

*Primary Examiner* — Catherine S Branch
*Assistant Examiner* — Olga Lucia Donahue
(74) *Attorney, Agent, or Firm* — LUCAS & MERCANTI, LLP

(57) ABSTRACT

Provided is a flame-retardant resin composition containing a thermoplastic resin and a polysaccharide, wherein the polysaccharide includes an acidic polysaccharide composed of one or more selected from the group consisting of a polysaccharide having an acidic functional group, a derivative of the polysaccharide having an acidic functional group in which a site other than the acidic functional group is modified, and a salt thereof; and a total number of the acidic functional group and the salt thereof per monosaccharide unit in the acidic polysaccharide is in the range of 0.2 to 1.5.

10 Claims, 1 Drawing Sheet

(56) References Cited

FOREIGN PATENT DOCUMENTS

| | | | | | |
|---|---|---|---|---|---|
| JP | 2010-031230 | A | | 2/2010 | |
| JP | 2013-231092 | A | | 11/2013 | |
| WO | WO-2008044471 | A1 | * | 4/2008 | C08L 67/04 |

OTHER PUBLICATIONS

English Translation of CN 112375289 A (Year: 2021).*
English Translation of WO 2008044471 A1 (Year: 2008).*
English Translation of JPH-0543747 (Year: 1993).*
Office Action issued for the related Japanese patent application No. 2021-114712, mailed on Feb. 12, 2025, with machine English translation, 8 pages.
Office Action, dated Jun. 10, 2025, issued for the corresponding Japanese Patent Application No. 2021-114712, 7 pages, with English translation.

* cited by examiner

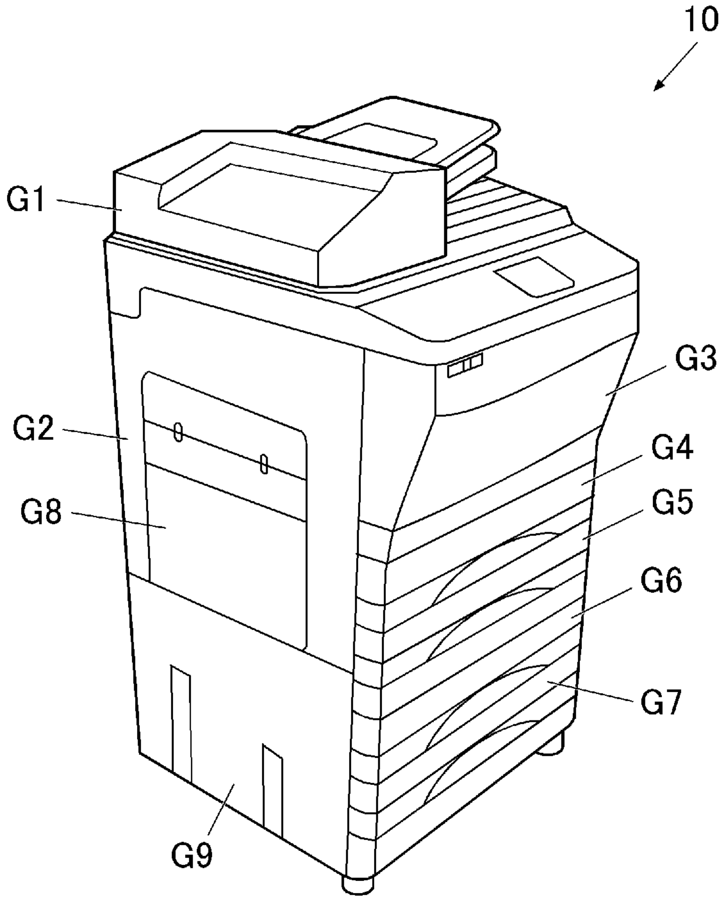
10
G1
G2
G8
G9
G3
G4
G5
G6
G7

FLAME-RETARDANT RESIN COMPOSITION, FLAME-RETARDANT RESIN HOUSING, AND ELECTRONIC DEVICE

CROSS-REFERENCE TO RELATED APPLICATIONS

The entire disclosure of Japanese Patent Application No, 2021-114712 filed on Jul. 12, 2021 is incorporated herein by reference in its entirety.

BACKGROUND

Technological Field

The present invention relates to a flame-retardant resin composition, a flame-retardant resin housing, and an electronic device. More particularly, the present invention relates to a flame-retardant resin composition in which flame-retardancy and strength are maintained in the resulting molded product while using a flame-retardant with low petroleum resource content, a flame-retardant resin housing manufactured using the flame-retardant resin composition, and an electronic device using a component manufactured with the flame-retardant resin composition.

Description of the Related Art

It is known that polysaccharides are blended in a resin compositions as flame-retardants (see Patent Document 1: JP-A 2006-77215). Polysaccharide are compound whose basic backbone is a cyclic structure containing a large amount of hydroxy groups, and they generate water vapor as a result of dehydration and condensation upon heating during combustion, resulting in a flame-retardant effect due to cooling by a large amount of heat absorption, dilution of combustion gas, and blocking of oxygen. In addition, the carbonization of polysaccharides after dehydration is expected to form a film (char (carbonized layer)) with heat-insulating effects and flame-retardant properties. However, when dispersed in resin compositions, it is difficult to achieve flame-retardancy due to their compatibility with resins and the dehydration reaction caused by heating during resin mixing.

In addition, as a polysaccharide-modified flame-retardant, a flame-retardant with a phosphate ester structure attached to the hydroxy group moiety in the cellulose molecule is known (see Patent Document 2: JP-A 2010-031230). The phosphate ester structure on cellulose in the flame-retardant is a part of the structure of phosphoric acid flame-retardants given to the cellulose structure, and because it utilizes the flame-retardant mechanism of phosphoric acid flame-retardants, the flame-retardant property increases according to the ratio of phosphorus in the material. Therefore, its effectiveness as a flame-retardant was limited because the phosphorus concentration was relatively low compared to general phosphoric acid flame-retardants.

Biodegradable flame-retardants with a hydroxy group and a carboxy group in their molecules, such as tartaric acid, citric acid, gluconic acid, lactic acid, malic acid, and gallic acid, are also known as flame-retardants for use in resin compositions (see Patent Document 3: JP-A 2003-213149). However, the biodegradable flame-retardants exemplified in the literature have low melting points and decomposition temperatures, making it difficult for the flame-retardant to remain as a component of the molded product, which is obtained by injection molding of the thermally melted resin composition into a mold, for example, and the flame-retardancy of the molded product is reduced. This was a problem.

SUMMARY

The present invention was made in view of the above problems and circumstances, and an object of the present invention is to provide a flame-retardant resin composition that maintains flame-retardancy and strength in the resulting molded product while using a flame-retardant with low petroleum resource content, a flame-retardant resin housing manufactured using the flame-retardant resin composition, and an electronic device using a component manufactured with the flame-retardant resin composition.

In order to solve the above problem, the inventor of the present invention, in the process of examining the cause of the above problem, has developed the following flame-retardant. This flame-retardant is an acidic polysaccharide composed of one or more selected from the group consisting of a polysaccharide having an acidic functional group, a derivative thereof, and a salt thereof. By using a polysaccharide in which the total number of the acidic functional group and the salt thereof per monosaccharide unit in the acidic polysaccharide is in a specific range, the amount of petroleum resources contained in the flame-retardant in the flame-retardant resin composition may be reduced, and the flame-retardancy and strength of the molded product made of the same flame-retardant resin composition may be maintained. That is, the above issues related to the present invention are solved by the following means.

To achieve at least one of the above-mentioned objects of the present invention, a flame-retardant resin composition that reflects an aspect of the present invention is as follows.

A flame-retardant resin composition comprising a thermoplastic resin and a polysaccharide, wherein the polysaccharide includes an acidic polysaccharide composed of one or more selected from the group consisting of a polysaccharide having an acidic functional group, a derivative of the polysaccharide having an acidic functional group in which a site other than the acidic functional group is modified, and a salt thereof; and a total number of the acidic functional group and the salt thereof per monosaccharide unit in the acidic polysaccharide is in the range of 0.2 to 1.5.

By the above means of the present invention, it is possible to provide a flame-retardant resin composition in which flame-retardancy and strength are maintained in the obtained molded product while using a flame-retardant having a low content of petroleum resources. Further, it is possible to provide a flame-retardant resin housing manufactured by using the flame-retardant resin composition and an electronic device using a component manufactured by using the flame-retardant resin composition.

Although the mechanism of expression or mechanism of action of the effect of the present invention has not been clarified, it is inferred as follows.

The acidic polysaccharide contained in the flame-retardant resin composition of the present invention is considered that the dehydration condensation reaction when heated is promoted as compared with the polysaccharide having no acidic functional group, due to the presence of an acidic functional group or a salt thereof (hereinafter, these are also collectively referred to as "acidic functional group and other") in the structure. Therefore, compared to general neutral polysaccharides without an acidic functional group, such as cellulose, water vapor is generated more rapidly, and at the same time, a film is formed on the surface of the resin by the accelerated carbonization reaction, resulting in improved flame-retardancy.

In the present invention, the total number of the acidic functional group per monosaccharide unit of the above acidic polysaccharides is 0.2 or more to make the resulting molded products flame-retardancy enough to withstand actual use. Also, by setting the total number of the acidic functional group per monosaccharide unit to 1.5 or less, the strength of the resulting molded product is made to withstand actual use. When the total number of the acidic functional group per monosaccharide unit exceeds 1.5, especially in a highly hydrophobic thermoplastic resin, intermolecular hydrogen bonding by acidic functional groups becomes pronounced in the resin, and shrinkage occurs during molding. This results in reduced strength or strength uniformity in the molded product. In addition, warpage is more likely to occur due to the shrinkage during molding, making the resin composition unsuitable for use in the molding of housings, for example.

BRIEF DESCRIPTION OF THE DRAWINGS

The advantages and features provided by one or more embodiments of the invention will become more fully understood from the detailed description given hereinbelow and the appended drawing which are given by way of illustration only, and thus are not intended as a definition of the limits of the present invention.

The FIGURE shows a schematic diagram of a large-size photocopier as an example of application of the molded products of the flame-retardant resin composition of the present invention.

DETAILED DESCRIPTION OF THE EMBODIMENTS

Hereinafter, one or more embodiments of the present invention will be described. However, the scope of the invention is not limited to the disclosed embodiments.

The flame-retardant resin composition of the present invention is a flame-retardant resin composition containing a thermoplastic resin and a polysaccharide, wherein the polysaccharide includes an acidic polysaccharide composed of one or more selected from the group consisting of a polysaccharide having an acidic functional group, a derivative of the polysaccharide having an acidic functional group in which a site other than the acidic functional group is modified, and a salt thereof. The total number of the acidic functional group and the salt thereof per monosaccharide unit in the acidic polysaccharide is in the range of 0.2 to 13. This feature is a technical feature common to each of the following embodiments.

From the viewpoint of the expression of the effect of the present invention, the total number of the acidic functional group and the salt thereof per monosaccharide unit in the acidic polysaccharide is preferably in the range of 0.6 to 1.2. From the viewpoint of expressing the effect of the present invention, it is also preferred that the acidic functional group is a carboxy group or a sulfo group.

As an embodiment of the present invention, from the viewpoint of expressing the effect of the present invention, it is preferable that the content of the acidic polysaccharide to the total amount of the flame-retardant resin composition is in the range of 5 to 40 mass %.

As an embodiment of the present invention, it is preferable that the polysaccharide derivative having an acidic functional group is a cross-linked polysaccharide in which the hydroxy groups in the sugar chain of two or more polysaccharide molecules are cross-linked. It is also preferable that the derivative of polysaccharide having an acidic functional group is a cross-linked polysaccharide in which the hydroxy groups in the sugar chain of two or more polysaccharide molecules are cross-linked by epichlorohydrin. Compared to uncrosslinked polysaccharides, the cross-linked polysaccharides have improved heat resistance against heating during molding to obtain a molded product from the flame-resistant resin composition. In other words, the cross-linked polysaccharide is less likely to react during molding, as a result, a molded product in which the decrease in the flame-retardant effect from the flame-retardant resin composition is suppressed may be obtained.

As an embodiment of the present invention, from the viewpoint of expressing the effect of the present invention, it is preferable that the acidic polysaccharide is at least one selected from the group consisting of alginic acid, alginic acid salt, carrageenan, pectin, xanthan gum and gellan gum, or a cross-linked polysaccharide obtained by cross-linking at least one selected from these.

As an embodiment of the present invention, from the viewpoint of expressing the effects of the present invention, it is preferable that a metallic hydroxide is further contained in the range of 5 to 20 mass % of the total amount of the flame-retardant resin composition. Further, the flame-retardant resin composition of the present invention preferably contains aluminum hydroxide particles having an average primary particle diameter in the range of 10 to 100 nm as the metal hydroxide.

As an embodiment of the present invention, when the thermoplastic resin is a polyolefin resin, the effect of the present invention is more remarkably exhibited.

The flame-retardant resin housing of the present invention is a flame-retardant resin housing manufactured by using the flame-retardant resin composition, and the flame-retardant resin composition is the flame-retardant resin composition of the present invention.

The electronic device of the present invention is characterized in that the molded product of the flame-retardant resin composition of the present invention is used as a component.

Hereinafter, the present invention, its constituent elements, and modes and embodiments for carrying out the present invention will be described in detail. In addition, in this application. "to" is used in the meaning which includes the numerical values described before and after "to" as the lower limit value and the upper limit value.

Flame-Retardant Resin Composition

The flame-retardant resin composition of the present invention is a flame-retardant resin composition containing a thermoplastic resin and a polysaccharide, wherein the polysaccharide includes an acidic polysaccharide composed of one or more selected from the group consisting of polysaccharides having an acidic functional group, a derivative of the polysaccharide having an acidic functional group in which a site other than the acidic functional group is modified, and a salt thereof, and the total number of the acidic functional group and the salt thereof per monosaccharide unit in the acidic polysaccharide is in the range of 0.2 to 13.

Hereinafter, an acidic polysaccharide composed of one or more selected from the group consisting of a polysaccharide having an acidic functional group, a derivative of the polysaccharide having an acidic functional group in which a site other than the acidic functional group is modified, and a salt thereof, and having the total number of the acidic functional group and the salt thereof per monosaccharide unit in the acidic polysaccharide being in the range of 0.2 to 13 is referred to as an "acidic polysaccharide (A)".

The flame-retardant resin composition of the present invention contains a thermoplastic resin and an acidic polysaccharide (A). In the flame-retardant resin composition of the present invention, the acidic polysaccharide (A) functions as a flame-retardant. In addition to the thermoplastic resin and the acidic polysaccharide (A), the flame-retardant resin composition of the present invention may optionally contain various additives that are generally contained in flame-retardant resin compositions. The following is an explanation of each component in the flame-retardant resin composition of the present invention.

(Thermoplastic Resin)

As a thermoplastic resin contained in the flame-retardant resin composition of the present invention, known thermoplastic resins may be used without any particular restrictions. Examples of the thermoplastic resin include a polyolefin resin, a polystyrene resin, a polycarbonate resin, an aromatic polyester resin, a polyphenylene sulfite resin, a polyamideimide resin, a polyether ether ketone resin, a polyether sulfone resin, a polyimide resin, a polychlorinated vinyl resin, a polyamide resin, a polyacetal resin, an acrylic resin, a polystyrene thermoplastic elastomer, polyolefin thermoplastic elastomer, 1.2 polybutadiene thermoplastic elastomer, an ethylene-vinyl acetate copolymer thermoplastic elastomer, a fluoroelastomer, and chlorinated polyethylene thermoplastic elastomer.

Further, as the thermoplastic resin contained in the flame-retardant resin composition of the present invention, a thermoplastic resin generally treated as a biodegradable resin may be used. Examples of the biodegradable thermoplastic resin include an aliphatic polyester, a polyamino acid, a polyvinyl alcohol, a polyalkylene glycol, and copolymers containing these polymers. As the thermoplastic resin, one type of the above resin may be used alone, or two or more types may be used in combination.

Examples of the above polystyrene resin include a polystyrene resin, a syndiotactic polystyrene resin, an acrylonitrile-styrene copolymer (AS resin), an acrylonitrile-butadiene styrene copolymer (ABS resin).

Examples of the aromatic polyester resin include aromatic polyesters having a structure in which an aromatic dicarboxylic acid or an ester derivative component thereof and a diol component such as an aliphatic diol or an alicyclic diol are linked by an ester reaction. Specific examples include polyethylene terephthalate, polypropylene terephthalate, polybutylene terephthalate, polyethylene naphthalate, polybutylene naphthalate, polyethylene-1,2-bis(phenoxy)ethane-4,4'-dicarboxylate, and copolymerized polyester such as polyethylene isophthalate/terephthalate, polybutylene terephthalate/isophthalate, polybutylene terephthalate/decanedicarboxylate.

Examples of the aliphatic polyester which is a biodegradable thermoplastic resin include polyoxy acid which is a (co)polymer of oxy acid and a polycondensate of an aliphatic diol and an aliphatic dicarboxylic acid. Examples of the polyoxy acid include poly-L-lactic acid (PLLA), poly-D-lactic acid (PDLA), a random copolymer of L-lactic acid and D-lactic acid, and a stereocomplex of L-lactic acid and D-lactic acid such as polylactic acid, polycaprolactone, polyhydroxybutyric acid, and polyhydroxyvaleric acid. Examples of the polycondensate of the aliphatic diol and the aliphatic dicarboxylic acid include polyethylene succinate, polybutylene succinate (PBS), and polybutylene adipate.

The use of biodegradable thermoplastic resin as a thermoplastic resin is preferable from the viewpoint of reducing environmental load. The biodegradable thermoplastic resin may also be used in combination with a non-biodegradable thermoplastic resin to create a thermoplastic resin that has the advantages of both.

The thermoplastic resin preferably contain a polyolefin resin as its main component. The polyolefin resin content in the thermoplastic resin is preferably 50 mass % or more, more preferably, it is 60 mass % or more, and still more preferably, it is 80 mass % or more. In the flame-retardant resin composition of the present invention, it is particularly preferable that the thermoplastic resin comprises only a polyolefin resin.

The content of the thermoplastic resin in the flame-retardant resin composition of the present invention is the amount obtained by subtracting the content of the acidic polysaccharide (A) and various other additives optionally contained from the flame-retardant resin composition.

<Polyolefin Resin>

The polyolefin resin is a homopolymer or a copolymer polymerized with an olefin as a main component of a monomer component. In addition, in this specification. "olefin" means an aliphatic chain type unsaturated hydrocarbon which has one double bond.

Here, the main component constituting the resin (polymer) means a component having an amount of 50 mass % or more in all the monomer components constituting the polymer. The polyolefin resin is a homopolymer or a copolymer preferably containing olefin as 60 to 100 mass %, more preferably 70 to 100 mass %, still more preferably 80 to 100 mass % of the total amount of monomers.

Olefin copolymers include copolymers of olefins with other olefins or copolymers of olefins with other monomers copolymerizable with olefins. The content of the above other monomer in polyolefin resins is preferably less than 30 mass %, and more preferably 0 to 20 mass % in the total monomer components.

Preferred olefins are α-olefins having 2 to 12 carbons. Examples of the olefin include ethylene, propylene, 1-butene, isobutene, 1-pentene, 3-methyl-1-butene, 1-hexene, 1-octene, and 1-decene. In the polymerization of polyolefin resins, one olefin may be used alone or in combination with two or more olefins. Examples of other monomers copolymerizable with the olefin include cyclic olefins such as cyclopentene and norbornene, and diene such as 1,4-hexadiene and 5-ethylidene-2-norbornene. In addition, monomers such as vinyl acetate, styrene, (meth)acrylic acid and its derivatives, vinyl ether, maleic anhydride, carbon monoxide, and N-vinylcarbazole may be used. One of the above other monomers may be used alone or in combination with two or more monomers when polymerizing polyolefin resins. The term "(meth)acrylic acid" means at least one of acrylic acid and methacrylic acid.

Specific examples of the polyolefin resin include polyethylene resins containing ethylene as a main component, such as high-density polyethylene (HDPE), low-density polyethylene (LDPE), and linear low-density polyethylene (LLDPE); polypropylene resins containing propylene as a main component, such as polypropylene (propylene homopolymer), ethylene-propylene copolymer, propylene-butene copolymer, ethylene-propylene-butene copolymer, and ethylene-propylene-diene copolymer, polybutene, and polypentene.

Specific examples of the polyolefin resin include, in addition, ethylene-vinyl acetate copolymer (EVA), ethylene-ethyl acrylate copolymer, polyketone, and copolymers produced with metallocene catalysts. Also included are chemically reacted and modified compounds of these polymers, specifically an ionomer resin, a saponified EVA, and an olefinic elastomer produced using dynamic vulcanization in an extruder.

A polyethylene resin and a polypropylene resin are preferred as a polyolefin resin, and a polypropylene resin is more preferred. The stereo-regularity of the structure derived from propylene in polypropylene-based resins may be isotactic, syndiotactic, or atactic. Polypropylene is further preferred as a polypropylene-based resin.

The thermoplastic resin may contain one or more polyolefin resins. The thermoplastic resin may be a commercially available product.

(Acidic Polysaccharides (A))

An acidic polysaccharide (A) is composed of one or more selected from the group consisting of a polysaccharide having an acidic functional group, a derivative thereof (provided that the derivative has a modified site other than the acidic functional group), and a salt thereof, where the total number of the acidic functional group and the salt thereof per monosaccharide unit in the acidic polysaccharide is in the range of 0.2 to 1.5.

In the present specification, a polysaccharide is a general term for substances in which a large number of monosaccharide molecules are dehydrated and condensed by glycosidic bonds. The type of monosaccharide that is a constituent unit of saccharide is 1 or 2 or more. As the monosaccharide, pentose or hexose is preferable, and hexose is more preferable. The degree of polymerization of polysaccharides is, for example, 50 to 20.000, preferably 200 to 1.500, and more preferably 200 to 1,100.

A derivative of a polysaccharide having an acidic functional group is a derivative in which a site other than the acidic functional group of the polysaccharide is modified. In the present specification, unless otherwise specified, the derivative of a polysaccharide having an acidic functional group is used in the above meaning. The derivatives of polysaccharides having an acidic functional group include compounds in which an atom at a site other than the acidic functional group of the polysaccharide is replaced with a different atom or a substituent. The derivatives of polysaccharides further include compounds obtained by combining with other compounds or other molecules of the polysaccharide via a functional group other than the acidic functional group such as a hydroxy group originally possessed by the sugar chain of the polysaccharide. The derivatives of polysaccharides having an acidic functional group include cross-linked polysaccharides described later.

In the present invention, polysaccharides with an acidic functional group, their derivatives and their salts are collectively referred to as "acidic polysaccharides". The total number of an acidic functional group and the salt per monosaccharide unit in the acidic polysaccharide is hereinafter also referred to simply as "acidic functional group number". An acidic polysaccharide (A) is an acidic polysaccharide with an acidic functional group number in the range of 0.2 to 1.5.

An acidic polysaccharide (A) may comprise one or more selected from the group consisting of a polysaccharide having an acidic functional group, a derivative thereof, and a salt thereof. When an acidic polysaccharide (A) is composed of one acidic polysaccharide, the acidic functional group number of the acidic polysaccharide is in the range of 0.2 to 1.5. When the acidic polysaccharide (A) is composed of two or more acidic polysaccharides, the acidic functional group number of the acidic polysaccharide (A) is in the range of 0.2 and 1.5. The acidic functional group number does not have to be in the range of 0.2 to 1.5 in each acidic polysaccharide, as long as the acidic functional group number is in the range of 0.5 to 1.5. It is preferable that the acidic functional group number is in the range of 0.2 to 1.5 in each of the two or more kinds of acidic polysaccharides constituting the acidic polysaccharide (A).

The acidic functional group number of the acidic polysaccharide (A) is preferably in the range of 0.6 to 1.2, from the viewpoint of enhancing the effect of the invention. The range of 6 to 1.0 is particularly preferred.

In the present invention, the acidic functional group number of the acidic polysaccharide may be calculated, for example, by the following method.

Method for Determining the Acidic Functional Group Number

To determine the acidic functional group number in the acidic polysaccharide contained in the flame-retardant resin composition, first extract the acidic polysaccharide from the flame-retardant resin composition by an appropriate method. The molecular structure of the polysaccharide constituting the sugar chain is identified by thermogravimetric analysis and infrared spectroscopy (IR) of the extracted acidic polysaccharide.

The acidic functional group number per monosaccharide unit in the acidic polysaccharide is determined using an ashification measurement method. About 0.7 g of the sample (acidic polysaccharide) is weighed, wrapped in filter paper, placed in a porcelain crucible, and thoroughly incinerated at 600° C. After cooling, it is transferred to a 500-mL beaker and mixed with about 250 mL of water, plus 35 mL of 0.05 mol/L sulfuric acid. The mixture is boiled for 30 minutes, then cooled. Phenolphthalein indicator is added to the mixture, and the excess acid is titrated back with 0.1 mol/L potassium hydroxide to calculate the acidic functional group number according to the following equation (1).

$$\text{Acidic functional group number}=Mc\times A/(10000-Ma\times A) \quad \text{Equation (1):}$$

The meaning of each sign in Equation (1) is as follow.

- A: Volume [mL] of 0.05 mol/L sulfuric acid consumed by the binding alkali in 1 g of sample
- Mc: Chemical formula amount per monosaccharide structure of the polysaccharides in the sample
- Ma: Chemical formula amount of alkali salt of acidic functional group Examples of the acidic functional group possessed by the acidic polysaccharide (A) include a carboxy group (—COOH), a sulfo group (—$SO_3H$), a thiocarboxy group (—CSOH), a sulfino group (—$SO_2H$), and a sulfeno group (—SOH). Among these, a carboxy group and a sulfo group are preferred. The acidic functional group may be an acidic functional group having a sulfo group, for example, an acidic functional group (—O—$SO_3H$) in which the sulfo group is bonded to an oxygen atom. Examples of the salt of the acidic functional group include a salt with an alkali metal such as Li, Na and K, a salt with an alkaline earth metal such as Mg. Ca, Sr and Ba, and an alkyl(ammonium) (for example, $R_4N^+$—(Rs are independently a hydrogen atom or an alkyl group having 1 to 3 carbon atoms, where at least one of R is an alkyl group).

The molecular weight of the acidic polysaccharide (A) is preferably in the range of 10.000 to 250.000, more preferably in the range of 20.000 to 80.000, as the polystyrene-based weight average molecular weight determined by gel permeation chromatography (GPC).

The acidic polysaccharide (A) is, for example, an acidic polysaccharide having a naturally occurring acidic functional group (acidic functional group or a salt thereof), and having the acidic functional group number in the range of 0.2 to 1.5. Further, the acidic polysaccharide (A) may be an acidic polysaccharide obtained by introducing an acidic functional group into a polysaccharide having no acidic functional group so that the acidic functional group number is in the range of 0.2 to 13. Further, acidic polysaccharides in which the number of a naturally occurring acidic functional group is not in the range of 0.2 to 1.5 can be used. It may be an acidic polysaccharide in which an acidic functional group is introduced or separated so that the acidic functional group number is in the range of 0.2 to 1.5.

The derivative may be, for example, a compound in which an atom (for example, a hydrogen atom) at a site other than the acidic functional group of the acidic polysaccharide into which the naturally occurring acidic polysaccharide or the acidic functional group has been introduced is replaced with a substituent such as a halogen atom or a hydrocarbon group. Also, an ester derivative and an ether derivatives obtained by reacting a hydroxy group originally possessed by the sugar chain of the acidic polysaccharide with a compound having a functional group reactive with a hydroxy group may be cited. Similarly, when an acidic polysaccharide have a functional group other than a hydroxy group, it may be made into a derivative by reacting with other compound using the functional group. The derivative may also be a cross-linked polysaccharide as described below. In the present invention, among such derivatives, derivatives having an acidic functional group number in the range of 0.2 to 1.5 may be used as an acidic polysaccharide (A).

When the acidic polysaccharide (A) is composed of a combination of two or more acidic polysaccharides as described above, the individual acidic polysaccharides to be combined do not necessarily have an acidic functional group number in the range of 0.2 and 1.0. The individual acidic polysaccharides may be selected so that the acidic functional group number in the combined acidic polysaccharide (A) is in the range of 0.2 to 1.5. Examples of the acidic polysaccharide include pectin, alginic acid, propylene glycol alginate, carboxymethylcellulose, xanthan gum, gum arabic, karaya gum, plantain, xylan, arabic acid, tragacanthic acid, khava gum, linseed acid, cerulonic acid, richeninuronic acid, gellan gum, ramuzan gum, wellan gum, carrageenan, glycosaminoglycans (for example, hyaluronic acid, chondroitin-4-sulfate, chondroitin-6-sulfate, dermatan sulfate, keratin sulfate, and heparin), and their salts.

In the present invention, acidic polysaccharides with an acidic functional group number in the range of 0.2 to 1.5 may be used as an acidic polysaccharide (A) among the above acidic polysaccharides.

Among these, as the acidic polysaccharide (A), at least one selected from the group consisting of alginic acid, alginic acid salt, carrageenan, pectin, xanthan gum and gellan gum is preferable, from the viewpoint of heat resistance stability when mixed in the resin composition. When used alone, it is preferable that the acidic functional group number is in the range of 0.2 to 13.

The acidic functional group number in alginic acid, carrageenan, pectin, xanthan gum, and gellan gum may also be determined from the molecular structural formula. For example, the structure of alginic acid is shown in Formula (A) below. As shown in Formula (A), the acidic functional group possessed by alginic acid is a carboxy group (—COOH). From the molecular structure in Formula (A), the acidic functional group number of alginic acid may be determined to be 1.0.

Formula (A)

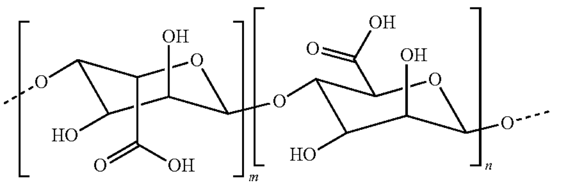

Further, for example, as carrageenan, there are three types of carrageenan: kappa-carrageenan whose molecular structure is represented by Formula (C1), iota-carrageenan whose molecular structure is represented by Formula (C2), and lambda-carrageenan whose molecular structure is represented by Formula (C3). As shown in formulas (C1) to (C3), the acidic functional groups possessed by carrageenan are sulfo groups, more specifically, acidic functional groups in which a sulfo group is attached to an oxygen atom (—O—$SO_3H$). In Formulas (C1) to (C3), the acidic functional group is described as an ionized state (—$OSO_3^-$).

From the molecular structure in Formula (C1), the acidic functional group number of kappa-carrageenan is 0.5. From the molecular structure in Formula (C2), the acidic functional group number of iota-carrageenan is 1.0. In Formula (C3), R is typically H (30%) or $SO_3^-$ (70%), and the acidic functional group number of lambda-carrageenan is 1.35 from the molecular structure in Formula (C3).

Formula (C1)

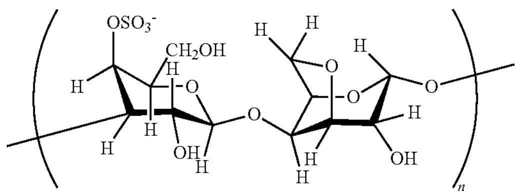

Formula (C2)

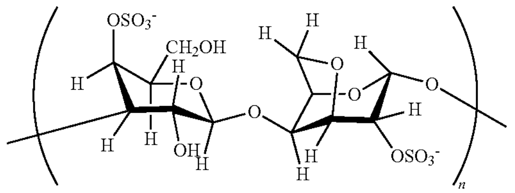

Formula (C3)

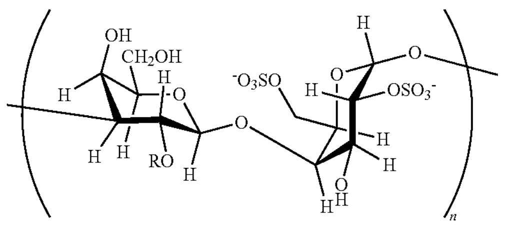

Among the above acidic polysaccharides, carboxymethyl cellulose is an acidic polysaccharide obtained by introducing an acidic functional group into cellulose. Carboxymethyl cellulose is used in the present invention as the acidic polysaccharide (A) by adjusting the acidic functional group number within the above range by adjusting the production conditions.

Carboxymethyl cellulose may be produced by a known manufacturing method. Specifically, carboxymethyl cellulose may be produced by the method described in JP-A 2000-34301. This method contains the step of reacting cellulose with alkali at a temperature of 20 to 50° C. to produce alkali cellulose, and the step of reacting the alkali cellulose with monochloroacetic acid to produce carboxymethyl cellulose.

Alternatively, it may be produced by another method described in JP-A 2012-12553. After mixing cellulose with an alkaline agent and monohaloacetic acid or its salt, the mixture is heated to 40 to 90° C. to obtain carboxymethyl cellulose.

In either method, the acidic functional group number in the resulting carboxymethyl cellulose may be adjusted by adjusting the amount of monochloroacetic acid or monohaloacetic acid added to the cellulose. The structural formula of carboxymethyl cellulose may be expressed, for example, by the following Formula (CMC). In Formula (CMC). R represents independently H or $CH_2COOH$. When averaged within a molecule, carboxymethyl cellulose in which 0.2 to 1.5 of Rs in Formula (CMC) are $CH_2COOH$ may be used as the acidic polysaccharide (A).

Formula (CMC)

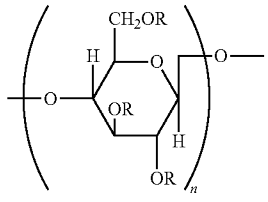

In addition to carboxymethyl cellulose, examples of the acidic polysaccharide in which an acidic functional group is introduced into cellulose include carboxyalkyl (for example, 2 to 3 carbon atoms) cellulose, sulfoethyl cellulose, and hydroxypropylmethyl cellulose acetate succinate. Further, a polysaccharide having no acidic functional group other than cellulose, for example, starch, agarose, or guar gum, which is introduced with an acidic functional group so that the acidic functional group number is in the range of 0.2 to 1.5 in the acidic polysaccharide may also be used in the present invention.

As the acidic polysaccharide (A), a cross-linked polysaccharide as a derivative of the acidic polysaccharide described above (however, the acidic functional group number when used alone is 0.2 to 1.5) may be used.

In the present specification, "cross-linked polysaccharide" refers to a compound having a structure in which the hydroxy groups in the sugar chain of two or more polysaccharide molecules are cross-linked. Cross-linked polysaccharides are obtained, for example, by cross-linking hydroxy groups between at least different molecules of polysaccharides using a cross-linking agent. The resulting cross-linked polysaccharide may contain a structure in which two hydroxy groups in the same molecule are joined via a crosslinking agent, as long as the crosslinking is between different molecules. The polysaccharide molecules to be cross-linked may be the same or different.

In the present specification, "cross-linked polysaccharide" means a compound having a structure in which hydroxy groups in the sugar chain of two or more polysaccharide molecules are crosslinked. Cross-linked polysaccharides are obtained, for example, by cross-linking hydroxy groups between at least different molecules of the polysaccharide with a cross-linking agent. The obtained cross-linked polysaccharide may contain a structure in which two hydroxy groups are bonded via a cross-linking agent in the same molecule as long as they are cross-linked between different molecules. The types of polysaccharide molecules cross-linked may be the same or different.

Cross-linking agents used in obtaining cross-linked polysaccharides from acidic polysaccharides include compounds having two or more functional groups that are reactive with hydroxy groups. The functional groups possessed by the cross-linking agent include an epoxy group, a chloro group, a silyl group, an isocyanate group, and an acid anhydride. Epichlorohydrin, hexamethylene diisocyanate, and tetraethyl silicate are examples of cross-linking agents, with epichlorohydrin being preferred.

Cross-linking of acidic polysaccharides with epichlorohydrin is performed, for example, by the reactions shown in Scheme (I-1) and Scheme (I-2) below as an example. In each formula, "*" indicates the bonding portion with the sugar backbone of the acidic polysaccharide. Scheme (I-1) is performed under alkaline conditions. In Scheme (I-1), the epoxy ring of epichlorohydrin opens the ring and reacts with the OH group of the polysaccharide molecule to give intermediate (P). Furthermore, according to Scheme (I-2), the terminal chloro group derived from epichlorohydrin in intermediate (P) reacts with the OH group of another polysaccharide molecule to give a compound in which two polysaccharide molecules are cross-linked by the linking group ($—CH_2—CH(OH)—CH_2—$).

Although the reactions shown in Scheme (I-1) and Scheme (I-2) were described above as intermolecular reactions, the reactions shown in Scheme (I-1) and Scheme (I-2) may be carried out in parallel and within a single molecule. Further, in the finally obtained reaction product, the same molecular terminal-$CH_2—CH(OH)—CH_2—Cl$ as in the intermediate (P) may remain.

Scheme (I-1)

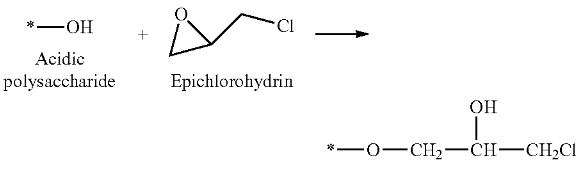

Acidic polysaccharide
Epichlorohydrin
Intermediate (P)

Scheme (I-2)

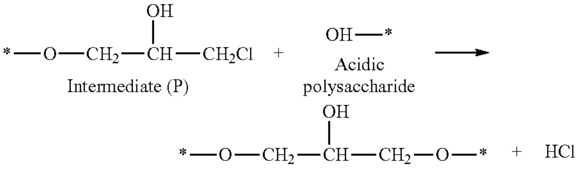

Intermediate (P)
Acidic polysaccharide
Cross-linked polysaccharide

The degree of cross-linking in cross-linked polysaccharides may be adjusted by the amount of cross-linking agent added to the acidic polysaccharide. The degree of cross-linking in the cross-linked polysaccharide should be such that the weight average molecular weight of the resulting cross-linked polysaccharide is similar to the preferred range of weight average molecular weight of the acidic polysaccharide (A) described above.

The acidic functional group number of the resulting cross-linked polysaccharide is theoretically the same as that of the acidic polysaccharide used as a raw material. However, acidic functional groups may react during production, and the acidic functional group number of the resulting cross-linked polysaccharide is usually smaller than that of the acidic polysaccharide used as a raw material. Therefore, when synthesizing cross-linked polysaccharides for use in the present invention, the acidic functional group number of the resulting cross-linked polysaccharides should be measured by the above method, and cross-linked polysaccharides that are within the range of the above invention is used.

In the flame-retardant resin composition of the present invention, the content of acidic polysaccharide (A) is preferably in the range of 5 to 40 mass % relative to the total amount of flame-retardant resin composition, and it is more preferred to be in the range of 20 to 30 mass %. When the content of acidic polysaccharide (A) in the flame-retardant resin composition is within the above range, it is easy to achieve both expression of flame-retardancy and maintenance of strength in the resulting molded product.

(Other Flame-Retardants)

The flame retardant-resin composition of the present invention contains an acidic polysaccharide (A) as a flame-retardant. The flame-retardant may only composed of an acidic polysaccharide (A), or other flame-retardants other than the acidic polysaccharide (A) (simply referred to as "other flame-retardants") may be included to the extent that the effect of the present invention is not impaired. Other flame-retardants include, for example, a polysaccharide other than an acidic polysaccharide (A), a metal hydroxide, a condensed phosphate ester, and intumescent flame-retardants.

As other flame-retardants, metal hydroxides are preferred because they enhance the flame-retardant effect of acidic polysaccharides (A) and because they contain less petroleum resources.

When the above flame-retardants contain metal hydroxides as other flame-retardants, the content is preferably in the range of 5 to 20 mass % of the total amount of flame-retardant resin composition. It is more preferable to be in the range of 5 to 10 mass %. When the content of metal hydroxide in the flame-retardant resin composition is within the above range, it is easier to achieve a higher level of both flame-retardancy and maintenance of strength in the resulting molded product.

Aluminum hydroxide and magnesium hydroxide are examples of the above metal hydroxide, with aluminum hydroxide being particularly preferred.

Particles are preferable as the form of the metal hydroxide. The particle shape is not particularly limited, and examples thereof include a spherical shape, a spindle shape, a plate shape, a scale shape, a needle shape, and a fibrous shape. The average primary particle diameter of the metal hydroxide particles is preferably in the range of 10 nm to 100 run, and more preferably it is in the range of 10 to 100 nm. The average primary particle diameter of the metal hydroxide particles is, for example, the volume-based median diameter (D50). The volume-based median diameter (D50) is determined, for example, by a laser diffraction and scattering method using a device of LA-96052 (manufactured by HORIBA. Ltd.).

The above metal hydroxide particles may be surface-modified by a surface modifier if necessary. Surface modifiers used for surface modification include alkylsilazane compounds such as hexamethyldisilazane (HMDS), dimethyldimethoxysilane, dimethyldiethoxysilane, and alkylalkoxysilanes such as trimethylmethoxysilane, methyltrimethoxysilane, and butyltrimethoxysilane, chlorosilanes such as dimethyldichlorosilane and trimethylchlorosilane, silicone oil, silicone varnish, and various fatty acids. One of these surface modifiers may be used alone, or two or more thereof may be mixed and used.

(Other Additives)

Examples of additives other than the flame-retardant that may be optionally contained in the flame-retardant resin composition of the present invention include an antioxidant, a filler, and a crystal nucleating agent. The content of other additives in the flame-retardant resin composition of the present invention is within the range that does not impair the effect of the present invention, and it is, for example, in the range of 0 to 30 mass % of the total flame-retardant resin composition. A range of 0 to 20 mass % is more preferred. A total content of 30 mass % or less is preferred.

(Production of Flame-Retardant Resin Composition)

The flame-retardant resin composition of the present invention may be obtained by melt kneading a thermoplastic resin and an acidic polysaccharide (A), and other flame-retardants that may be included as needed, preferably metal hydroxide, and other components. The method of melt kneading is not particularly limited, and any known melt kneading method may be used.

A specific example of the melt kneading method is as follows. After premixing each component using various mixers such as or a fast mixer known as a tumbler mixer or a Henschel mixer, the premixed components are melt kneaded with a kneading device such as a Banbury mixer, a roll mixer, a Plastograph, a single-screw extruder, a twin-screw extruder, and a kneader. Among these, the manufacturing method of melt kneading using an extruder is more preferable because of its high production efficiency, and the manufacturing method using a twin-screw extruder is even more preferable. After each component is melt kneaded using an extruder and the kneaded material is extruded into strands, the extruded stranded kneaded material may be processed into pellets, flakes, or other forms.

It is preferable that each component is thoroughly dried before the preliminary mixing of the components. The drying temperature at this time is not particularly limited, but 60 to 100° C., is preferred. The drying time is not particularly limited, but it is preferable to be 2 to 6 hours. Furthermore, it is preferable to perform the drying under reduced pressure, as this will allow the drying to progress more easily. The above drying may be performed again after pre-mixing.

The temperature during melt kneading is, for example, 150 to 280° C., and is selected according to the thermoplastic resin used. When a polyolefin resin, for example, a polypropylene resin, is used as the thermoplastic resin, the temperature during melt kneading is preferably 180 to 270° C., and more preferably 190 to 230° C. The temperature during melt kneading corresponds to the cylinder temperature in a mixing device such as a twin-screw extruder, for example. The cylinder temperature refers to the temperature of the highest cylinder section when multiple temperature settings are made in the cylinder of the mixing device. The kneading pressure is not limited, but it is preferable to be 1 and 20 MPa.

The discharge rate from the mixing device during melt kneading is not particularly limited, but from the fact that melt kneading is sufficiently performed, it is preferable to perform at a discharge rate of 10 to 100 kg/hr. and more preferably at a discharge rate of 20 to 70 kg/hr.

It is preferable that the molten mixture melted and kneaded by the mixing device as described above is cooled after being extruded from the mixing device. The cooling treatment is not particularly limited, and for example, a method of immersing the kneaded material in water at 0 to 60° C. for water cooling, a method for cooling with a gas at −40 to 60° C., and a method for contacting the kneaded product with a metal at −40 to 60° C., may be used.

The flame-retardant resin composition may take various forms such as powder, granule, tablet, pellet, flake, fiber, and liquid.

According to the flame-retardant resin composition of the present invention, it is possible to produce molded products that retain flame-retardancy and strength while using a flame-retardant of an acidic polysaccharide (A) with low petroleum resource content.

Here, flame-retardancy is one of the properties of flame resistance, which refers to the property of slow burning but continuing to burn to some extent. There are JIS. ASTM, and other standards for evaluating flame resistance. The UL standard is made by an American "Underwriters Laboratories Inc.". This standard is established by and evaluated by the company.

In the molded product molded from the flame-retardant resin composition of the present invention, when evaluated by the above UL standards as a test piece of a given size, it is preferable to be evaluated as passing by UL94HB, more preferable to be evaluated as passing by UL94V-2, and still more preferable to be evaluated as passing by UL94V-0.

In addition, by using the flame-retardant resin composition of the present invention, molded products with good appearance and excellent mechanical strength, such as bending strength, may be obtained by the ordinary molding method described below, while having the above sufficient flame-retardant properties.

(Molded Product)

The flame-retardant resin composition of the present invention may be used to make molded products. The molded product may be used to produce a product with flame-retardant properties. In manufacturing molded products, the flame-retardant resin composition may be melted and molded in various types of molding machines. The molding method may be selected according to the form and application of the molded product. Examples thereof include injection molding, extrusion molding, compression molding, blow molding, calendering, and inflation molding. Secondary molding, such as vacuum molding or pressure molding, may also be performed on sheet or film-like molded products obtained by extrusion molding or calendering.

Molded products molded from the flame-retardant resin composition of the present invention are not particularly limited. Examples thereof include electrical and electronic components, exterior components, and interior components in the fields of home appliances and automobiles, as well as various packaging materials, household goods, office supplies, piping, and agricultural materials.

Flame-Retardant Resin Housing and Electronic Device

The present invention may provide a molded product manufactured by using the above-mentioned flame-retardant resin composition of the present invention as a flame-retardant resin housing. The articles to be accommodated by the flame-retardant resin housing are not particularly restricted. Examples of the flame-retardant resin housing include housings of various machines and devices, which are generally manufactured with a flame-retardant resin.

The present invention may provide electronic devices characterized by the use of the above molded products as components. The electronic devices are not restricted. Examples thereof include a computer, a scanner, a copying machine, a printer, a facsimile machine. OA equipment such as a multifunction device called an MFP (Multifunction Peripheral) that has these functions, and a digital printing system for commercial printing.

Molded products molded from the flame-retardant resin compositions of the present invention are preferably used as exterior components of electronic devices. The large-size photocopier shown in the FIGURE is used as an example. The FIGURE is a schematic diagram of a large-size photocopier 10. As shown in the FIGURE, the large-size photocopier 10 is externally encased with exterior components G1 to G9. Molded products molded from the flame-retardant resin composition of the present invention may be used for such exterior components.

EXAMPLES

Hereinafter, the present invention will be specifically described with reference to examples, but the present invention is not limited thereto. In addition, although the description of "parts" or "%" is used in the examples, it represents "parts by mass" or "mass %" unless otherwise specified.

Preparation of Flame-Retardant Resin Compositions

The following thermoplastic resins and flame-retardants (polysaccharides and metal hydroxides) were prepared as the constituent materials of the flame-retardant resin composition in the example.

(Thermoplastic Resin)

The following commercial available products were prepared as thermoplastic resins.

1. Polyolefin Resin
   - High-density polyethylene (PE): HI-ZEX (HDPE) 1300) (product name, manufactured by Prime Polymer Co. Ltd.)
   - Polypropylene resin (PP): Prime Polypro J715M (product name, manufactured by Prime Polymer Co. Ltd.)
2. Other Thermoplastic Resins
   - Polylactic acid resin (PLA): TERAMAC TE-8303 (product name, manufactured by Unitika, Ltd.)

(Metal Hydroxide)

- Aluminum hydroxide 1 (denoted by "$Al(OH)_3$-1" in Table II): KH-101 (product name, manufactured by Hayashi Kasei, Co., Ltd., primary particle size 0.9 μm)
- Aluminum hydroxide 2 (denoted by "$Al(OH)_3$-2" in Table II): Nano aluminum hydroxide (product name, manufactured by E.M. Japan, Co., Ltd., primary particle size 50 nm)
- Magnesium hydroxide (denoted by "$Mg(OH)_2$" in Table II): MAGSEEDS S-4 (product name, Konoshima Chemical Co., Ltd., primary particle size 0.8 μm, with surface coating by silane coupling agent)

(Polysaccharides)

As the polysaccharides, the polysaccharides A1 to A9 and the polysaccharides Cf1 and Cf2 shown in Table I were used. These are commercially available products or obtained from the following synthetic examples.

Polysaccharides A1 to A9 are polysaccharides applicable to the flame-retardant resin compositions of the present invention, and polysaccharides Cf1 and Cf2 are polysaccharides for comparison that are not applicable to the flame-retardant resin composition of the present invention.

TABLE I

| Polysaccharide Abbreviation | Compound name | Product name | Manufacturer | Acidic functional group number |
|---|---|---|---|---|
| A1 | Alginic acid | KIMICA Acid SA | KIMICA Corporation | 1.00 |
| A2 | Calcium alginate | Snow algin SAW-80 | KIMICA Corporation | 1.00 |
| A3 | Carrageenan (kappa-type) | Carrageenan WG-108 | Sansho Co., Ltd. | 0.50 |
| A4 | Carrageenan (iota-type) | Carrageenan CJ | Sansho Co., Ltd. | 1.00 |
| A5 | Carboxymethyl cellulose | Produced by Synthesis Example 1 | | 0.61 |
| A6 | Carboxymethyl cellulose | Produced by Synthesis Example 2 | | 0.20 |
| A7 | Cross-linked product of A2 | Produced by Synthesis Example 3 | | 0.80 |
| A8 | Cross-linked product of A4 | Produced by Synthesis Example 4 | | 0.30 |
| A9 | Carboxymethyl cellulose | Aqualon ® CMC-7LF | Ashland Inc. | 1.40 |
| Cf1 | Cellulose | Cellulose, powder, 38 μm passed product | Fujifilm Wako Pure Chemicals Co., Ltd. | 0.00 |
| Cf2 | Carboxymethyl cellulose | Produced by Synthesis Example 5 | | 1.70 |

Synthesis Example 1; Production of Polysaccharide A5

In a 5 L flask, 2.500 parts by mass of isopropyl alcohol, 180 parts by mass of water, and 100 parts by mass of powdered cellulose (cellulose, powder, 38 μm passed product (Fujifilm Wako Pure Chemicals Co., Ltd.); polysaccharide Cf1), were placed, and they were stirred at room temperature. To this was added a solution of 56.1 parts by mas of sodium hydroxide dissolved in 60 parts by mass of water was added. After stirring at 35° C. for 1 hour, a mixed liquid of 63.4 parts by mass of monochloroacetic acid and 45 parts by mass of isopropyl alcohol was added dropwise. The reaction was performed by stirring at 65° C. for 2 hours.

The resulting reaction solution was cooled to room temperature, taken out, and mixed with 1.000 parts by mass of 70% aqueous methanol solution and 3.7 parts by mass of acetic acid. They were stirred to neutralize excess sodium hydroxide. Then, 3,000 parts by mass of 70% aqueous methanol solution was added, and after stirring, the slurry was filtered, acetone washed, and dried to obtain 123 parts by mass of carboxymethyl cellulose as polysaccharide A5. The acidic functional group number of polysaccharide A5 was checked and found to be 0.61.

Synthesis Example 2; Production of Polysaccharide A6

In a 5 L flask, 2.500 parts by mass of isopropyl alcohol, 180 parts by mass of water, 100 parts by mass of powdered cellulose (cellulose, powder, 38 μm passed product (Fujifilm Wako Pure Chemicals Co., Ltd.); polysaccharide Cf1) were placed, and they were stirred at room temperature. To this was added a solution of 21.6 parts by mass of sodium hydroxide dissolved in 25 parts by mass of water. After stirring at 35° C. for 1 hour, a mixed liquid of 11.6 parts by mass of monochloroacetic acid and 15 parts by mass of isopropyl alcohol was added dropwise. The reaction was performed by stirring at 65° C. for 2 hours.

The resulting reaction solution was cooled to room temperature, taken out, and mixed with 1000 parts by mass of 70% aqueous methanol solution and 0.1 parts by mass of acetic acid. They were stirred to neutralize excess sodium hydroxide. Then, 3,000 parts by mass of 70% aqueous methanol solution was added, and after stirring, the slurry was filtered, acetone washed, and dried to obtain 103 parts by mass of carboxymethyl cellulose as polysaccharide A6. The acidic functional group number of polysaccharide A6 was checked and found to be 0.20.

Synthesis Example 3; Production of Polysaccharide A7

In a 3 L flask, 50 parts by mass of polysaccharide A2 (calcium alginate) shown in Table I, 500 parts by mass of ethanol, and 100 parts by mass of water were added and stirred. To this was added 16.8 parts by mass of calcium hydroxide, and the mixture was stirred at 30° C. for 1 hour. Thereafter, a mixed liquid of 30 parts by mass of epichlorohydrin mixed with 150 parts by mass of ethanol was added dropwise into the flask. The temperature of the mixture was raised to 50° C., and maintained at 50 to 60° C., and stirred for 3 hours. Next, a calcium hydroxide solution (containing 16.8 parts by mass of calcium hydroxide and 100 parts by mass of water) was added dropwise and stirred for 1.5 hours. To this was added 30 mass parts of epichlorohydrin and stirred for another 2 hours.

The resulting reaction solution was cooled to room temperature, filtered, and the filtrate was washed with water until the pH of the wash solution was near neutral. After drying, 52.1 parts by mass of cross-linked polysaccharide A2 was obtained as polysaccharide A7. The acidic functional group number of polysaccharide A7 was checked and found to be 0.80.

Synthesis Example 4; Production of Polysaccharide A8

In the same manner as in Synthesis Example 3, except that 50 parts by mass of polysaccharide A4 (carrageenan (iota-type)) shown in Table I was used instead of polysaccharide A2, 46.5 parts by mass of cross-linked polysaccharide A4 treated with epichlorohydrin was obtained as polysaccharide A8. The acidic functional group number of polysaccharide A8 was checked and found to be 0.30.

Synthesis Example 5; Production of Polysaccharide Cf2

In a 5 L flask, 2.500 parts by mass of isopropyl alcohol, 180 parts by mass of water, 100 parts by mass of powdered cellulose (cellulose, powder, 38 μm passed product (Fujifilm Wako Pure Chemicals Co., Ltd.); polysaccharide Cf1) were placed, and they were stirred at room temperature. To this was added a solution of 160 parts by mass of sodium hydroxide dissolved in 150 parts by mass of water, and the mixture was stirred at 35° C. for 1.5 hour. Thereafter, a mixed liquid of 180 parts by mass of monochloroacetic acid and 130 parts by mass of isopropyl alcohol was added dropwise. The reaction was performed by stirring at 65° C. for 3 hours.

The resulting reaction solution was cooled to room temperature, taken out, and stirred with the addition of 1.000 parts by mass of 70% aqueous methanol solution, and the excess hydroxide was neutralize by the addition of acetic acid. Then, 3.000 parts by mass of 70% aqueous methanol solution was added, and after stirring, the slurry was filtered, acetone washed, and dried to obtain 152 parts by mass of carboxymethyl cellulose as polysaccharide Cf2. The acidic functional group number of polysaccharide Cf2 was checked and found to be 1.7.

(Preparation of Flame-Retardant Resin Composition)

As pre-drying before mixing, the thermoplastic resin and the flame-retardants (polysaccharides and metal hydroxides) were each dried at 80° C. for 4 hours. Then, they were weighed and dry-blended in the component ratios (mass %) shown in Table II.

Next, the mixture obtained by dry blending was supplied at 10 kg/h from the raw material supply port (hopper) of the twin-screw extrusion kneader (KTX-30; Kobe Steel, Ltd.). Melt kneading was performed under the conditions that the cylinder temperature was 190° C., and the screw rotation speed was 200 rpm. The molten resin after mixing was cooled in a water bath at 30° C., and pelletized in a pelletizer to obtain flame-retardant resin compositions 1 to 17. Flame-retardant resin compositions 1 to 15 correspond to the flame-retardant resin compositions of the present invention, while flame-retardant resin compositions 16 and 17 are Comparative Examples.

EVALUATION

The flame-retardant resin compositions 1 to 17 obtained above were evaluated by performing the following Evaluations 1 to 3. The results are shown in Table II along with the composition of the flame-retardant resin compositions and the cylinder setting temperature during molding.

Evaluation 1: Evaluation of Production of Exterior Component

Each of the resulting pelletized flame-retardant resin compositions 1 to 17 was dried in a hot-air circulating dryer at 80° C. for 5 hours. After drying, using an injection molding machine (J1300E-05 manufactured by Japan Steel Works, Ltd.), a simulated molded product assuming an exterior component G8 of the large-size photocopier shown in FIG. 1 was molded at a cylinder temperature and a mold temperature of 80° C., as shown in Table II. The sample was taken from the center of the mold. The obtained samples were visually observed and evaluated according to the following criteria. When the sample was rated at AA, BB or CC, it was judged to be acceptable for practical use.

AA: No external appearance defects

BB: Slight warpage in external appearance is observed, but this can be corrected by mold modification.

CC: Warpage in external appearance is observed, but this can be improved by modifying the mold and revising the molding conditions.

DD: Severe warpage is observed, and no improvement is expected by modifying the mold or changing the molding conditions.

Evaluation 2: Flame-Retardancy

Each of the resulting pellets of flame-retardant resin composites 1 to 17 were dried at 80° C. for 4 hours. Then it was molded in an injection molding machine (J55ELII manufactured by Nippon Steel Works, Ltd.) with a cylinder temperature listed in Table II at a mold temperature of 50° C. to obtain a test sample having a length of 125 mm, a width of 13 mm and a thickness of 1.6 mm.

The test samples were then humidified for 48 hours in a thermostatic chamber at 23° C., and 50% humidity. A flame-retardant test was conducted in accordance with the UL94 test (combustion test of plastic materials for device components) established by the US Underwriters Laboratories (UL). For the test, the UL94V test method was first carried out, and the UL94HB test was carried out on the material which did not reach V-2 at UL94V, and the order of flame-retardancy was confirmed. Flame-retardancy was then evaluated based on the following evaluation criteria. The material was considered to be acceptable when the flame-retardancy was evaluated to be AA, BB or CC.

AA: V-0 (Passed)

BB: V-1 or V-2 (passed)

CC: HB (passed)

DD: Out of specification (also failed HB test)

Evaluation 3: Bending Strength

Each of the resulting pellets of flame-retardant resin composites 1 to 17 were dried at 80° C. for 4 hours. Then it was molded in an injection molding machine (J55ELII manufactured by Nippon Steel Works, Ltd.) with a cylinder temperature listed in Table II at a mold temperature of 50° C. to obtain a test sample having a length of 80 mm, a width of 10 mm and a height of 4.0 mm.

After discarding 300 shots in the number of molding shots, then 100 consecutive shots were molded. The variation in bending strength, XTS (%), of the 100 moldings obtained was determined from the following formula and evaluated according to the following evaluation criteria. When the value of XTS was AA, BB or CC, it was judged to be acceptable for practical use.

$$XTS\ (\%)=(TR\text{max}-TR\text{min})/(TR\text{av})\times 100$$

In the above formula, TRmax represents the maximum value (MPa) of the bending strength of 100 molded products, TRmin represents the minimum value (MPa) of the bending strength of 100 molded products, TRav represents the average value (MPa) of the bending strength of 100 molded products. Here, the bending strength of the molded product is a value measured based on JIS K7171.

AA: TRav is 20 MPa or more, and XTS is less than 0.5%.

BB: TRav is 20 MPa or more, and XTS is 0.5% or more and less than 5%.

CC: TRav is 20 MPa or more, and XTS is 5% or more and less than 15%

DD: TRav is less than 20 MPa, or XTS is 15% or more

TABLE II

| Flame-retardant resin composition No. | Thermoplastic resin Type | Thermoplastic resin Amount | Polysaccharide Type | Polysaccharide Acidic functional group number | Polysaccharide Cross-linking | Polysaccharide Amount | Metal hydroxide Type | Metal hydroxide Average primary particle diameter | Metal hydroxide Amount | Remarks |
|---|---|---|---|---|---|---|---|---|---|---|
| | Composition [mass %] | | | | | | | | | |
| 1 | PE | 80 | A1 | 1.00 | None | 20 | — | — | 0 | Present Invention |
| 2 | PP | 60 | A1 | 1.00 | None | 40 | — | — | 0 | Present Invention |
| 3 | PP | 70 | A2 | 1.00 | None | 30 | — | — | 0 | Present Invention |
| 4 | PP | 70 | A3 | 0.50 | None | 30 | — | — | 0 | Present Invention |
| 5 | PP | 70 | A4 | 1.00 | None | 30 | — | — | 0 | Present Invention |
| 6 | PLA | 70 | A2 | 1.00 | None | 30 | — | — | 0 | Present Invention |
| 7 | PP | 70 | A5 | 0.61 | None | 30 | — | — | 0 | Present Invention |
| 8 | PP | 70 | A6 | 0.20 | None | 30 | — | — | 0 | Present Invention |
| 9 | PP | 70 | A9 | 1.40 | None | 30 | — | — | 0 | Present Invention |
| 10 | PP | 70 | A7 | 0.80 | Present | 30 | — | — | 0 | Present Invention |
| 11 | PP | 70 | A8 | 0.30 | Present | 30 | — | — | 0 | Present Invention |
| 12 | PP | 64 | A2 | 1.00 | None | 27 | $Al(OH)_3$-1 | 0.9 μm | 9 | Present Invention |
| 13 | PP | 64 | A2 | 1.00 | None | 27 | $Al(OH)_3$-2 | 50 nm | 9 | Present Invention |
| 14 | PP | 64 | A7 | 0.80 | Present | 27 | $Mg(OH)_2$ | 0.8 μm | 9 | Present Invention |
| 15 | PP | 67 | A7 | 0.80 | Present | 28 | $Al(OH)_3$-2 | 50 nm | 5 | Present Invention |
| 16 | PF | 70 | Cf1 | 0.00 | None | 30 | — | — | 0 | Comparative Example |
| 17 | PP | 70 | Cf2 | 1.70 | None | 30 | — | — | 0 | Comparative Example |

| Flame-retardant resin composition No. | Cylinder setting temperature [° C.] | Evaluation result: Appearance of Exterior Component | Evaluation result: Flame-retardancy | Evaluation result: Bending strength | Remarks |
|---|---|---|---|---|---|
| 1 | 190 | AA | CC | BB | Present Invention |
| 2 | 190 | BB | BB | AA | Present Invention |
| 3 | 190 | AA | BB | BB | Present Invention |
| 4 | 190 | AA | CC | AA | Present Invention |
| 5 | 190 | BB | BB | BB | Present Invention |
| 6 | 190 | BB | CC | BB | Present Invention |
| 7 | 190 | AA | BB | BB | Present Invention |
| 8 | 190 | BB | CC | AA | Present Invention |
| 9 | 190 | BB | BB | CC | Present Invention |
| 10 | 190 | AA | BB | AA | Present Invention |
| 11 | 190 | AA | BB | BB | Present Invention |
| 12 | 190 | BB | BB | AA | Present Invention |
| 13 | 190 | AA | BB | AA | Present Invention |
| 14 | 190 | AA | BB | AA | Present Invention |
| 15 | 190 | AA | AA | AA | Present Invention |
| 16 | 190 | BB | DD | BB | Comparative Example |
| 17 | 190 | CC | CC | DD | Comparative Example |

From Table II, it can be seen that the flame-retardant resin composition of the present invention maintains flame-retardancy and strength in the obtained molded product while keeping the amount of petroleum resources used low. In the flame-retardant resin composition 9 containing a polysaccharide having an acidic functional group number of 1.4, the shrinkage of the molded product became severe, and the bending strength variation of the molded test sample became large.

Although embodiments of the present invention have been described and illustrated in detail, the disclosed embodiments are made for purposes of illustration and example only and not limitation. The scope of the present invention should be interpreted by terms of the appended claims.

DESCRIPTION OF SYMBOLS

10: Large-size photocopier
G1 to G9: Exterior component

What is claimed is:

1. A flame-retardant resin composition comprising a thermoplastic resin and a polysaccharide, wherein the thermoplastic resin is a polyolefin resin, the polysaccharide includes an acidic polysaccharide composed of one or more selected from the group consisting of a derivative of a polysaccharide having an acidic functional group in which a site other than the acidic functional group is modified, and a salt thereof, the derivative of the polysaccharide having the acidic functional group is a cross-linked polysaccharide in which hydroxy groups in the sugar chain of two or more polysaccharide molecules are cross-linked, and a total number of the acidic functional group and the salt thereof per monosaccharide unit in the acidic polysaccharide is in the range of 0.2 to 1.5.

2. The flame-retardant resin composition according to claim 1, wherein the total number of the acidic functional group and the salt thereof per monosaccharide unit in the acidic polysaccharide is in the range of 0.6 to 1.2.

3. The flame-retardant resin composition according to claim 1, wherein the acidic functional group is a carboxy group or a sulfo group.

4. The flame-retardant resin composition according to claim 1, wherein a content of the acidic polysaccharide in the total amount of the flame-retardant resin composition is in the range of 5 to 40 mass %.

5. The flame-retardant resin composition according to claim 1, wherein the hydroxy groups in the sugar chain of the two or more polysaccharide molecules are cross-linked by epichlorohydrin.

6. The flame-retardant resin composition according to claim 1, wherein the acidic polysaccharide contains one selected from the group consisting of alginic acid, alginic acid salt, carrageenan, pectin, xanthan gum, and gellan gum, or a cross-linked polysaccharide cross-linked with at least one of these.

7. The flame-retardant resin composition according to claim 1, containing a metal hydroxide in the range of 5 to 20 mass % of the total amount of the flame-retardant resin composition.

8. The flame-retardant resin composition according to claim 7, wherein the metal hydroxide contains aluminum hydroxide particles having an average primary particle diameter in the range of 10 to 100 nm.

9. A flame-retardant resin housing comprising the flame-retardant resin composition according to claim 1.

10. An electronic device comprising a molded product of the flame-retardant resin composition according to claim 1 as a component.

* * * * *